March 22, 1938. D. E. WEBB 2,111,687
HYDRAULIC LOCKING MEANS FOR MOTOR VEHICLES
Filed Feb. 20, 1937 2 Sheets-Sheet 1
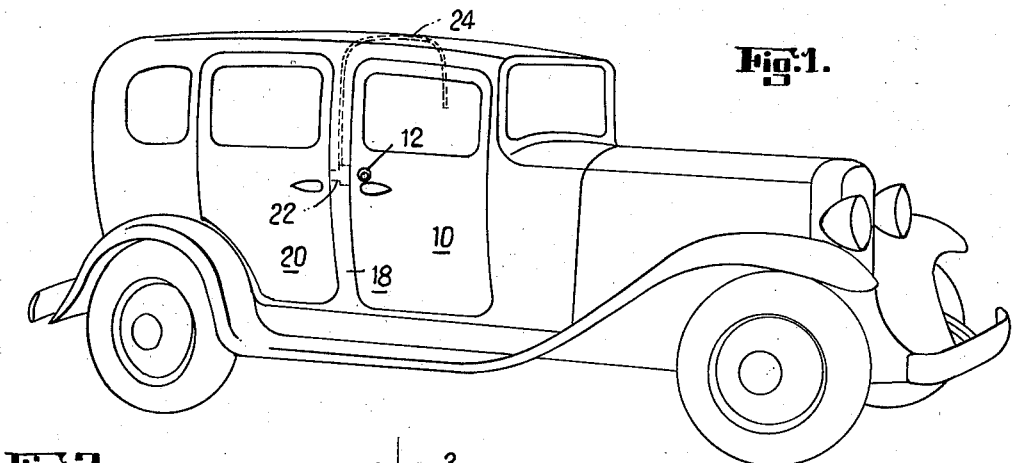
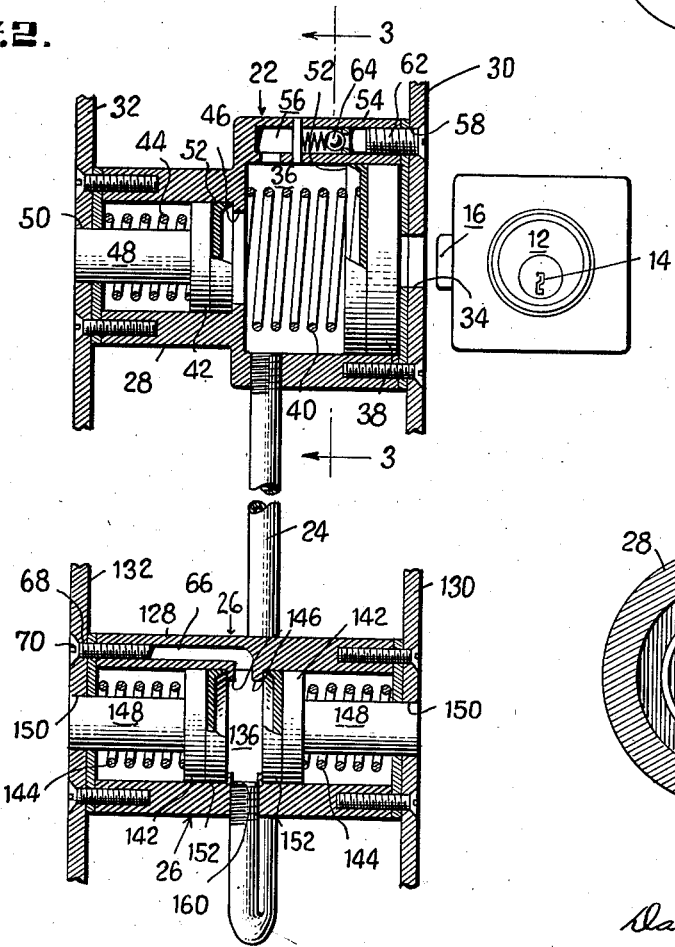
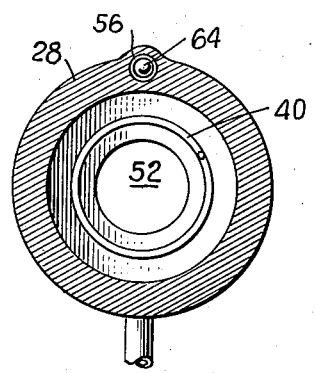
INVENTOR.
David E. Webb
BY Brown & Jones
ATTORNEYS.

March 22, 1938.   D. E. WEBB   2,111,687
HYDRAULIC LOCKING MEANS FOR MOTOR VEHICLES
Filed Feb. 20, 1937   2 Sheets-Sheet 2
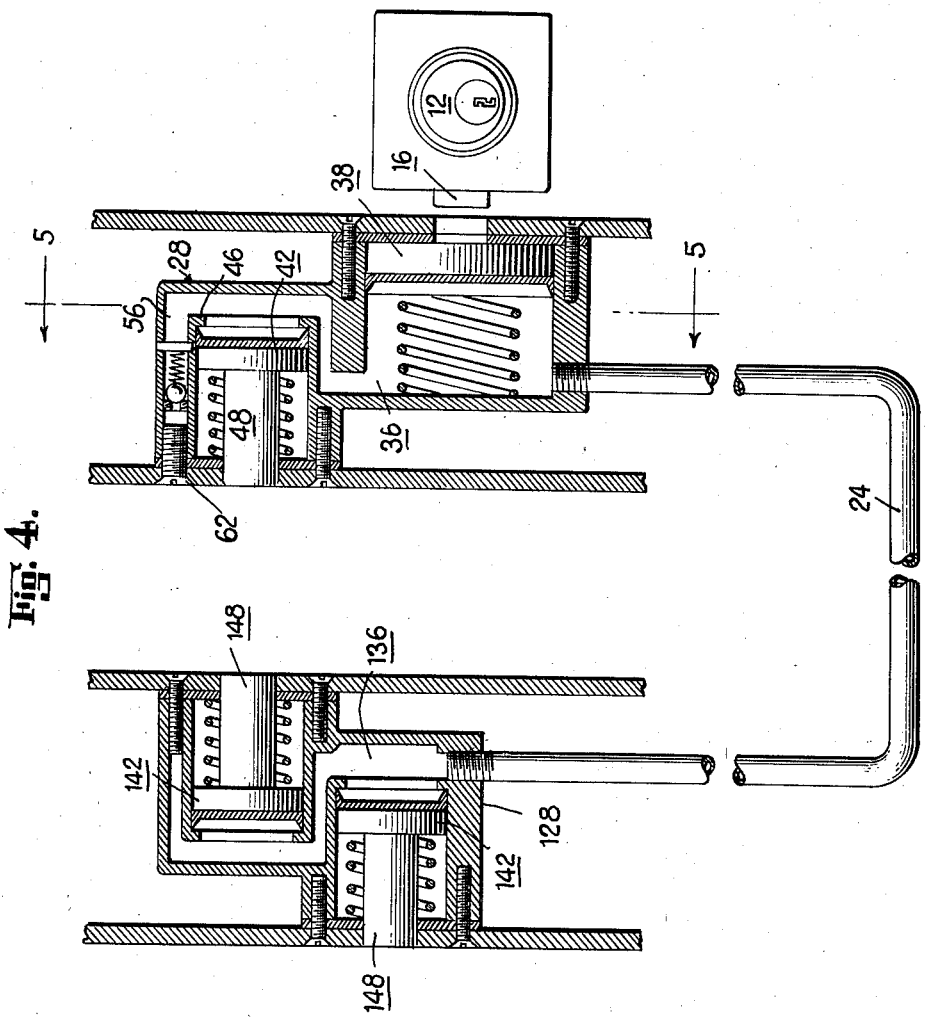
Fig. 4.
Fig. 5.
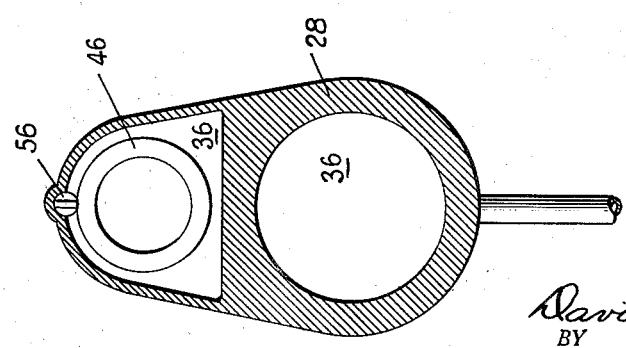
INVENTOR.
David E. Webb
BY
Brown & Jones
ATTORNEYS.

Patented Mar. 22, 1938

2,111,687

UNITED STATES PATENT OFFICE 2,111,687

HYDRAULIC LOCKING MEANS FOR MOTOR VEHICLES

David E. Webb, New York, N. Y., assignor of twenty percent to Ralph C. P. Lodge, New York, N. Y.

Application February 20, 1937, Serial No. 126,790

13 Claims. (Cl. 70—264)

This invention relates to locks and more specifically to locking means for an automotive vehicle.

In general, it is an object of the invention to provide a device of the character described, which will efficiently perform the purposes for which it is intended, which is simple and economical of construction, which can be expeditiously, conveniently and safely manipulated, and which can be readily manufactured and assembled.

Another object of the invention is to provide an automobile with a plurality of locks so mechanically connected that the locking or unlocking of one lock causes at least one other lock, at any part of the car, to lock or unlock automatically at the same time; to provide such an arrangement which may be inserted in the jamb between a front and rear door, so that the locking of the front door causes the rear door to lock; and to provide such a device which utilizes fluid pressure.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention, reference should be had to the following detailed description, taken in connection with the accompanying drawings, in which:

Figure 1 is a perspective view of a motor vehicle showing in dotted lines the position of the device shown in Fig. 2;

Fig. 2 is a vertical view, partly in cross-section, of a device embodying one form of the invention;

Fig. 3 is a cross-section taken along the line 3—3 of Fig. 2;

Fig. 4 is a view similar to Fig. 2 and of a modification of the device shown in Fig. 2; and Fig. 5 is a cross-section of Fig. 4 taken along the line 5—5 of Fig. 4.

It is contemplated by this invention to provide a device whereby the motion of a lock bolt in one door of an automobile positively locks not only that door but also positively throws the bolts or equivalent locking means in other doors of the car at the same time.

In the drawings, 10 denotes the front door of a motor vehicle, which door has a lock 12 with a keyhole 14 and a lock bolt 16. The door is locked to the adjacent door jamb 18 by the lock bolt through the use of any usual mechanical, non-fluid pressure means which may be hand-operated as by a key. Associated with the door jamb 18 between door 10 and door 20, there is a device shown generally at 22 for positively transmitting the motion of the bolt 16 to another bolt which locks door 20 when bolt 16 locks door 10. A connecting conduit 24 leads from the combination of parts shown at 22 to a similar combination 26, the latter being associated with some other door jamb, preferably the jamb between two other doors.

Between the front and rear sides of the jamb 18, there is a casing 28. One end of this casing is closed by the forward wall 30 of the jamb 18, the rear end being closed by the rear wall 32 of that jamb. The wall 30 has an opening 34 leading to the interior of the casing 28, and adapted to receive the bolt 16. The casing provides within it a chamber or cylinder 36. A piston 38 is held against the opening 34 by resilient means such as a spring 40 and forms a movable end wall for the cylinder.

A second piston 42 is also positioned in the casing 28 and is normally kept spaced from wall 32 by resilient means such as a spring 44. Since piston 42 is normally pushed inward of the chamber 36, it may be held at a predetermined position by and against a ledge 46 fixed to the interior wall of the chamber 36. A bolt-like element 48 is attached to piston 42 and when the latter moves toward wall 32 against the action of spring 44, the bolt 48 passes through an opening 50 in the wall 32 and into contact with the door 20 whereby the latter may be locked.

A fluid is maintained in the chamber 36. It is preferably liquid in form and may be a mixture of oil and alcohol. Washers 52 may prevent the fluid from coming in contact with, or seeping past, the pistons.

The operation of the device in one of its simpler forms will have now become clear. If door 20 is only to be locked along with door 10 by the bolt of door 10, conduit 24 is closed by any suitable valve means. Lock 12 is operated by a key or any other desired mechanism. Bolt 16 passes through opening 34 and strikes piston 38, moving the latter inwardly of the cylinder against spring 40. The fluid in the cylinder, being incompressible, exerts a force against the other piston 42 which moves against spring 44 and thrusts bolt 48 through the opening 50 into locking association with door 20.

By the addition of other cylinders 26, more or less similar to cylinder 36, the motion of bolt 16 may be caused to be communicated to doors of the vehicle more remote from door 10. Under such circumstances, it is desirable to have piston 38 somewhat larger than the other pistons in order that a movement of piston 38 may displace sufficient of the fluid to cause a desired amount of displacement of each of the other smaller pistons. As an example of this more remote locking, casing 128 may be positioned between some other pair of doors and extend between walls 130 and 132 which are a part of, or associated with, the jamb between the last-mentioned doors. Walls 130 and 132, together with casing 128, form a chamber. Slidable within this chamber are a pair of pistons 142. Springs 144 tend to push the pistons 142 away from the walls 130 and 132. The pistons are prevented from being pushed too far by stopping means such as the rings 146 on the inside of the casing 128. Washers 152 may prevent the passage of fluid from the cylinder 136 past the pistons. Fluid is supplied from conduit 24 to chamber 136 through an opening 160. Bolts 148 are attached respectively to pistons 142 and when the latter move outwardly, due to the introduction of more fluid into chamber 136, the bolts are pushed through openings 150 in the walls 130 and 132. Once the bolts extend through the openings, they may be availed of in any convenient fashion for the locking of the adjacent doors, which latter are not shown in Fig. 2.

Means are provided for introducing the fluid into the system. This may be accomplished in various ways. As shown in Fig. 2, there is a supplementary portion 54 of the casing 28. This portion forms a well 56 in registry with an opening 58 in wall 30. The opening may be closed by a screw 62 and valve means 64 may permit the introduction of oil into the well 56 but prevent its escape outwardly past the screw 62. If the well is above chamber 36, the fluid feeds through into the latter by gravity. Means may also be provided for removing fluid from the system. They may be in the lowermost of any one or more portions of the system. As shown, however, there is a conduit 66 leading through the upper part of casing 26 from chamber 136 to an opening 68 in wall 132, the opening being closed by a screw 70.

In certain instances, the jamb between the doors may present a relatively narrow space and the cylinder 36, as well as the cylinder 136, may each be divided into two portions by a proper design of casings 28 and 126 so that the portion which contains the piston 38 is not aligned axially with pistons 42 and pistons 142 are not aligned axially with each other, but are laterally displaced. Since fluid pressures are transmitted equally throughout irregularly-shaped chambers, this modified arrangement does not affect the operation of the parts.

From the foregoing, it will be apparent that the motion of locking bolt 16 in one door positively causes the motion of other bolts which lock other doors. Of course, actual interlocking may be accomplished by means other than simple bolts and by motions other than simple outward displacements, the latter depending upon which face of the piston pressure is applied on. Whenever the main bolt 16 is withdrawn, the resilient means bring the other locking elements back into their normal position.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and useful and desire to secure by Letters Patent is:

1. In a motor vehicle, the combination comprising a plurality of locks, mechanical, non-fluid pressure means operable by hand and adapted for operating one of said locks, fluid pressure means connecting said locks, means associated with said one lock and adapted for changing the pressure in said pressure means when said one lock is locked, and means associated with another of said locks and operable by a predetermined pressure in said pressure means and adapted for locking said other lock.

2. In a motor vehicle, the combination comprising a plurality of locks, mechanical, non-fluid pressure means operable by hand and adapted for operating one of said locks, fluid pressure means connecting said locks, means associated with said one lock and adapted for changing the pressure in said pressure means when said one lock is unlocked, and means associated with another of said locks and operable by a predetermined pressure in said pressure means and adapted for unlocking said other lock.

3. In a motor vehicle, the combination comprising a plurality of locks, mechanical, non-fluid pressure means operable by hand and adapted for operating one of said locks, fluid pressure means connecting said locks, means associated with said one lock and adapted for changing the pressure in said pressure means when said one lock is operating, and means associated with another of said locks and operable by a predetermined pressure in said pressure means and adapted for operating said other lock.

4. The combination comprising a locking bolt, mechanical, non-fluid, hand operated means for operating said bolt, means providing a chamber, fluid in said chamber, an element associated with said chamber and movable by said bolt, when said bolt is brought to locking position, to change the pressure of said fluid, and a second element associated with said chamber and adapted, under the changed pressure, to change position and in the changed position to act as a locking element.

5. The combination comprising locking means, mechanical, non-fluid, hand-operated means for motivating said locking means, means providing a chamber having a movable wall whereby the volume of said chamber may be varied, said wall being movable by said locking means, said chamber having a second movable wall whereby the volume of said chamber may be varied, a fluid in said chamber adapted for transmitting pressure between said walls, a second locking means, and means operable by the motion of said second wall for locking said second locking means.

6. The combination comprising locking means, mechanical, non-fluid, hand-operated means for motivating said locking means, means providing a chamber having a movable wall whereby the volume of said chamber may be varied, said wall being movable by said locking means, said chamber having a second movable wall whereby the volume of said chamber may be varied, a fluid in said chamber adapted for transmitting pressure between said walls, a second locking means, means operable by the motion of said second wall for locking said second locking means, and resilient means associated with said walls tending to maintain said walls in such positions that said locking means are in inoperative condition.

7. The combination comprising locking means, mechanical, non-fluid, hand-operated means for motivating said locking means, means providing a chamber having a movable wall whereby the volume of said chamber may be varied, said wall being movable by said locking means, said chamber having a second movable wall whereby the volume of said chamber may be varied, a fluid in said chamber adapted for transmitting pressure between said walls, a second locking means, means operable by the motion of said second wall for locking said second door, said chamber being between the first and second mentioned locking means.

8. In a motor vehicle having a door, a second door and a jamb between said doors, the combination with said doors and jamb of locking means associated with said first door, mechanical, non-fluid, hand-operated means for motivating said locking means, means providing a chamber having a movable wall whereby the volume of said chamber may be varied, said wall being movable by said locking means, said chamber having a second movable wall whereby the volume of said chamber may be varied, a fluid in said chamber adapted for transmitting pressure between said walls, locking means associated with said second door, means operable by the motion of said second wall for locking said second door, resilient means associated with said walls tending to maintain said walls in such positions that said locking means are in inoperative condition, said chamber being in said jamb and having two laterally disposed portions, said walls and respectively associated resilient means being respectively associated with said portions whereby said chamber requires a jamb of less breadth than if said portions were disposed along a common axis.

9. In a motor vehicle having a door and a second door, the combination with said doors of locking means associated with said first door, mechanical, non-fluid, hand-operated means for motivating said locking means, means providing a chamber having a movable wall whereby the volume of said chamber may be varied, said wall being movable by said locking means, said chamber having a second movable wall whereby the volume of said chamber may be varied, an incompressible fluid in said chamber and adapted for transmitting a motion of said first wall to said second wall, and means associated with said second wall and adapted, at a predetermined position of said second wall, for locking said second door.

10. In a motor vehicle having a door and a second door, the combination with said doors of locking means associated with said first door, mechanical, non-fluid, hand-operated means for motivating said locking means, means providing a chamber having a movable wall whereby the volume of said chamber may be varied, said wall being movable by said locking means, said chamber having a second movable wall whereby the volume of said chamber may be varied, a fluid in said chamber adapted for transmitting pressure between said walls, locking means associated with said second door, means operable by the motion of said second wall for locking said second door, resilient means associated with said walls tending to maintain said walls in such positions that said locking means are in inoperative condition, said chamber having two separate portions connected by a conduit, said walls and respectively associated resilient means being respectively associated with said portions.

11. In a motor vehicle having a door and a second door, the combination with said doors of a locking bolt associated with said first door, mechanical, non-fluid, hand-operated means for locking said door, a cylinder associated with said motor vehicle, a piston in said cylinder held in a predetermined position by a spring and movable by said bolt against said spring whereby the pressure in said cylinder is changed, a second piston in said cylinder and held in one position by a spring when the pressure in said cylinder has a predetermined value and movable against the last-mentioned spring to another position when there is a different pressure in said cylinder, and a locking bolt associated with said second piston and adapted for locking said second door when said second piston is in said other position.

12. In a motor vehicle having a door and a second door, the combination with said doors of a locking bolt associated with said first door, mechanical, non-fluid, hand-operated means for locking said door, a cylinder associated with said motor vehicle, a piston in said cylinder held in a predetermined position by a spring and movable by said bolt against said spring whereby the pressure in said cylinder is changed, a second piston in said cylinder and held in one position by a spring when the pressure in said cylinder has a predetermined value and movable against the last-mentioned spring to another position when there is a different pressure in said cylinder, and a locking bolt associated with said second piston and adapted for locking said second door when said second piston is in said other position, said last-mentioned spring being adapted to return said second piston to said one position when said first piston is released from the action of said first bolt.

13. In a motor vehicle having a door and a second door, the combination with said doors of a locking bolt associated with said first door, mechanical, non-fluid, hand-operated means for locking said door, a cylinder associated with said motor vehicle, a piston in said cylinder held in a predetermined position by a spring and movable by said bolt against said spring whereby the pressure in said cylinder is changed, a second piston in said cylinder and held in one position by a spring when the pressure in said cylinder has a predetermined value and movable against the last-mentioned spring to another position when there is a different pressure in said cylinder, and a locking bolt associated with said second piston and adapted for locking said second door when said second piston is in said other position, said pistons being in different portions of said cylinder, said portions being separated by a connecting conduit.

DAVID E. WEBB.